United States Patent
Terry

(10) Patent No.: US 8,333,894 B1
(45) Date of Patent: *Dec. 18, 2012

(54) MULTI-LEVEL FILTER DEVICE

(75) Inventor: Theophilus B. Terry, Somerville, TN (US)

(73) Assignee: Theophilus B. Terry, III, Somerville, TN (US)

( * ) Notice: Subject to any disclaimer, the term of this patent is extended or adjusted under 35 U.S.C. 154(b) by 103 days.

This patent is subject to a terminal disclaimer.

(21) Appl. No.: 12/729,069

(22) Filed: Mar. 22, 2010

Related U.S. Application Data

(63) Continuation-in-part of application No. 12/109,683, filed on Apr. 25, 2008, now Pat. No. 7,682,512.

(60) Provisional application No. 60/926,139, filed on Apr. 25, 2007.

(51) Int. Cl.
*B01D 29/44* (2006.01)

(52) U.S. Cl. ............ 210/747.1; 210/767; 210/804; 210/170.08; 210/299; 210/336; 210/489; 210/532.2

(58) Field of Classification Search .......... 210/747.1, 210/767, 802, 804, 85, 170.08, 299, 323.1, 210/335, 336, 435, 488, 489, 521, 522, 532.2
See application file for complete search history.

(56) References Cited

U.S. PATENT DOCUMENTS

| | | | |
|---|---|---|---|
| 4,634,525 A | 1/1987 | Yant | |
| 4,832,846 A | 5/1989 | Gavin | |
| 5,413,706 A | 5/1995 | Graves | |
| 5,584,993 A | 12/1996 | Van Der Schrieck | |
| 5,593,584 A | 1/1997 | Nurse, Jr. | |
| D386,241 S | 11/1997 | Nurse, Jr. | |
| 5,683,577 A | 11/1997 | Nurse, Jr. | |
| 5,736,035 A | 4/1998 | Nurse, Jr. | |
| D402,349 S | 12/1998 | Gavin | |
| 5,871,640 A | 2/1999 | Gavin | |
| 6,015,488 A | 1/2000 | Gavin | |
| D431,629 S | 10/2000 | Meyers | |
| 6,129,837 A | 10/2000 | Nurse, Jr. | |
| 6,234,200 B1 | 5/2001 | Hall | |
| 6,319,403 B1 | 11/2001 | Meyers | |
| 6,338,797 B1 | 1/2002 | Nurse, Jr. et al. | |
| 6,360,898 B1 | 3/2002 | Nurse, Jr. et al. | |
| 6,478,957 B1 | 11/2002 | Terry, III et al. | |
| 6,841,066 B2 | 1/2005 | Nurse, Jr. et al. | |
| 6,942,796 B2 | 9/2005 | Lacasse et al. | |
| 7,682,512 B2 * | 3/2010 | Terry, III | 210/170.08 |
| 8,075,774 B2 * | 12/2011 | Terry, III | 210/170.08 |
| 2007/0084781 A1 | 4/2007 | Hornback et al. | |
| 2011/0031175 A1 * | 2/2011 | Terry, III | 210/188 |

* cited by examiner

*Primary Examiner* — Christopher Upton
(74) *Attorney, Agent, or Firm* — Middleton Reutlinger; Chad D. Bruggeman; John F. Salazar

(57) ABSTRACT

The present invention is directed to a method for filtering fluid, preferably effluent fluid in a septic system, by providing a staged, filtering array in an effluent flow path, the stages positioned in an orientation designed to maximize filtering capability in conjunction with predetermined apertures.

23 Claims, 13 Drawing Sheets

MULTI-LEVEL FILTER DEVICE

CROSS-REFERENCE TO PRIOR APPLICATION

This is a continuation-in-part of U.S. patent application Ser. No. 12/109,683, filed on Apr. 25, 2008, which claims priority to, and benefit from, U.S. Provisional Application Ser. No. 60/926,139 filed Apr. 25, 2007, which is incorporated herein by reference.

FIELD OF THE INVENTION

The present invention is directed to filters used to separate suspended solids in a liquid solution. More specifically, the present invention is directed to methods and apparatuses for filtering septic tank effluent.

BACKGROUND

A number of different filtering devices are known for separating solid matter from water, such as, for example, waste water in septic tanks. Many of the known devices for removing waste water from septic tanks allow the solid materials to settle to the bottom of the tank and allow bacteria to react and digest the solid materials. The by-products of the reaction of the solid or semi-solid matter with the bacteria then pass through filtration to remove the remaining small particles, with the waste water being removed by overflow or by discharge pumps into a drain field. Known filtration systems employ a filter cartridge having a stack of settling plates with a weir wall integral to the top side of the settling plate. Such known filters, however, only have one level of filtration or screening. Therefore, any solids smaller than the aperture either pass onto the drainfield or become trapped on the settling plate requiring more frequent servicing. Other known systems employ a filter that has a stack of inclined filter plates that have an integral weir wall extending from the settling plate. This design allows solids to slide back down the inclined surface before passing through the aperture. However, in these known designs smaller particles that pass through the aperture become trapped inside by the weir wall and again require frequent servicing.

SUMMARY OF THE INVENTION

The filter of the present invention solves the recognized problems in the field by, among other advantages, creating multiple apertures between any two settling plates. This is accomplished by making the weir wall as a separate component that is inserted between two inclined settling plates, thus allowing solid and semisolid masses larger in size than the apertures to settle on the inclined plates and then slough back into the septic tank. When solids build up and eventually block the aperture below the weir wall, the flow can continue through the filter by flowing through the aperture above the weir wall. In another embodiment of the present invention a third aperture can be formed into the weir wall itself. This can lead to double, or triple the time between servicing and cleaning of the filters. This saves the homeowner significant time and cost, while insuring that their drainfields are protected from excessive solids.

Separating the partition or weir wall from being a part of either the top or bottom surface of the settling plate, and creating a plurality of apertures in the weir wall allows for at least doubling the filter area. By adding in additional apertures into the weir wall itself, at discrete locations on the wall, even more filtration area in the same size cartridge is provided. The separation of the weir walls into completely separate, or discrete system components makes for less expensive production of multiple filter models with varying levels of filtration. Instead of having to produce molds for different filter plates, one only has to make different inserts. By creating multiple partition walls with progressively finer levels of filtration, the service interval required is greatly increased. This also allows for a greater level of filtration to be accomplished per filter with less servicing and/or down time required. Currently, to accomplish this, multiple filters must to be installed in series at great expense to the consumer.

In addition, in known field filtration systems, the alarms used for filters do not give a true indication of the capacity left in the filters, as the alarm switch for these filters can only be located on the unfiltered side of the filter. The present invention allows this alarm switch to be located on the downstream side of the first filter partition. Thus, the filter is protected from having "gross" solids attach to the switch and causing a false alarm situation.

In one embodiment, the present invention provides methods and apparatuses for filtering effluent comprising providing a filtering assembly, said assembly comprising at least one substantially planar component attached to at least one partition. The planar component and the partition are attached to create at least one aperture having a predetermined dimension, with the planar components positioned at an incline. A housing is dimensioned to receive the filtering assembly, with the housing comprising an inlet and an outlet and a means for positioning said assembly within said housing. An effluent flow is then provided to the assembly in the housing and flows through the assembly such that only the effluent having predetermined characteristics moves past the partitions and angled planar surfaces.

In a further one embodiment, the present invention provides methods and apparatuses for filtering effluent comprising providing a filtering assembly, said assembly comprising a first and second substantially planar component, said first and second planar components spaced apart by at least a first and second partitions, said partitions each comprising one or more apertures, said apertures bounded partially by a surface of the first or second planar components, with said planar components positioned at an incline, or angle. A housing is provided dimensioned to receive the filtering assembly, said housing comprising an inlet and an outlet and a means for positioning the filtering assembly within said housing. An effluent flow is provided to the assembly in the housing and is directed through the filtering assembly such that the only effluent having predetermined characteristics moves past the partitions and angled planar surfaces. Solid or semisolid material of a predetermined dimension is retained in the filtering assembly, while solids or semisolids having a dimension less than said predetermined dimension, and/or liquid effluent, is allowed to pass through the filtering assembly. In a preferred embodiment, a series of filter assemblies are maintained in the housing in a stacked orientation, and at least one partition further comprises an additional integral aperture, located at a distance from the apertures located about the perimeter of the partition. The integral apertures are preferably completely bounded by the partition.

According to a further embodiment of the present invention, the partitions have similar or varying dimensions from each other, or preferably comprise spacers extending from the edges thereof, such that the first partition, when in position with a planar component provides apertures having a first dimension, and the second partition when in position with a planar component provides apertures having a second dimension, such that the first and second aperture dimensions, etc., are not equal. In the most preferred embodiment, multiple partitions are oriented relative to a planar component to create a series of apertures of varying dimension such that the aperture dimensions progressively decrease in the direction of an effluent flow.

Further objects, advantages and embodiments of the invention will become evident from the reading of the following detailed description of the invention wherein reference is made to the accompanying drawings.

DETAILED DESCRIPTION

Figure 5:
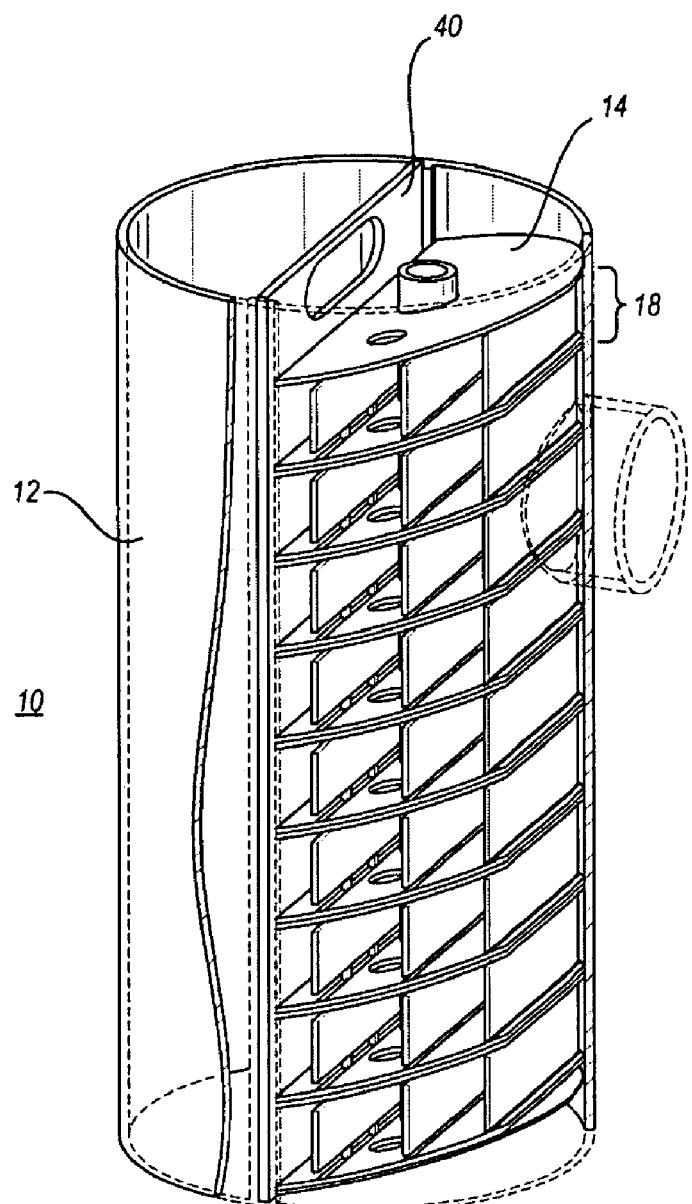
FIG. 5 shows a partially exposed view of the housing of FIG. 4 now comprising a plurality of inclined filter plates and a maintenance plate.
Figure 9:
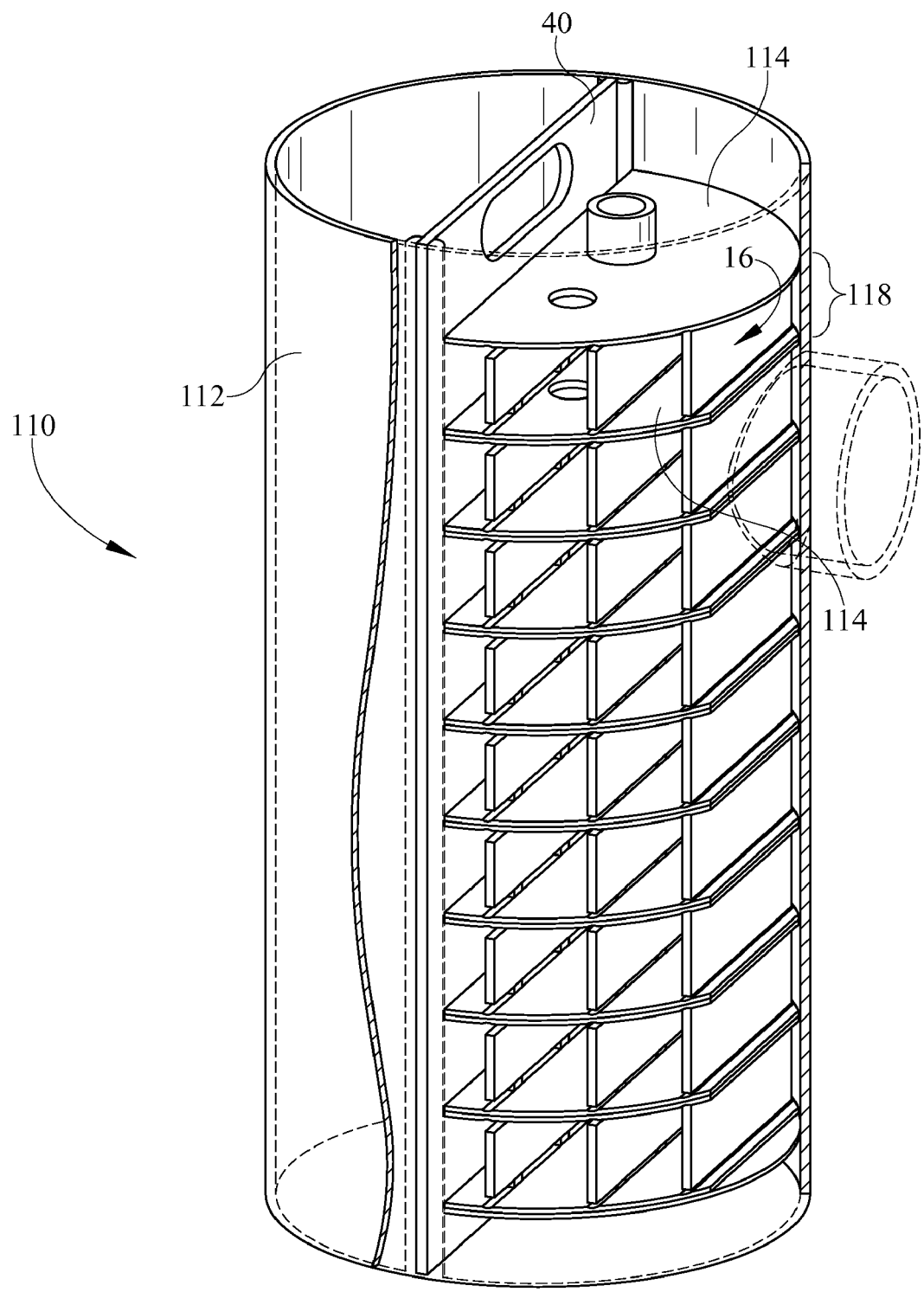
FIG. 9 shows a partially exposed side perspective view of a filter housing including a plurality of horizontal filter assemblies and a maintenance plate.

According to one embodiment of the present invention, and with specific reference to the Figures, as shown in FIG. 5, a new and improved effluent filter 10 is shown for uses, such as, for example, in septic systems. The filter 10 preferably comprises a housing, or case 12 surrounding at least two, and typically a plurality of inclined settling plates 14 separated by a multi-partition wall assembly 16 (See FIG. 1). Although the settling plates 14 are shown as inclined, it should be understood that the settling plates may be horizontal within the filter case. For example, as shown in FIG. 9, filter 110 may include a plurality of horizontal settling plates 114 separated by the multi-partition wall assembly 16.

Figure 1:
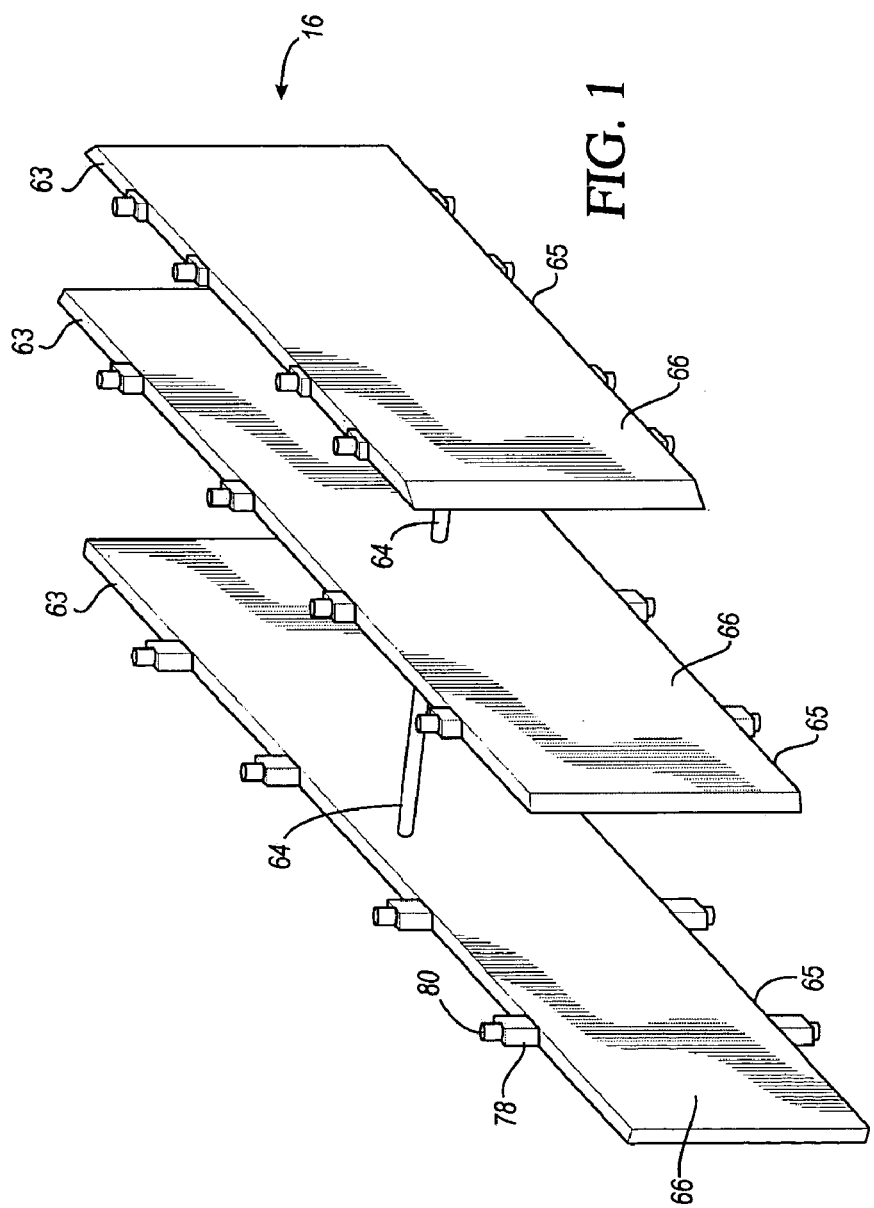
FIG. 1 shows a perspective drawing of one embodiment of the present invention showing a multi-partition wall filter component.
Figure 2:
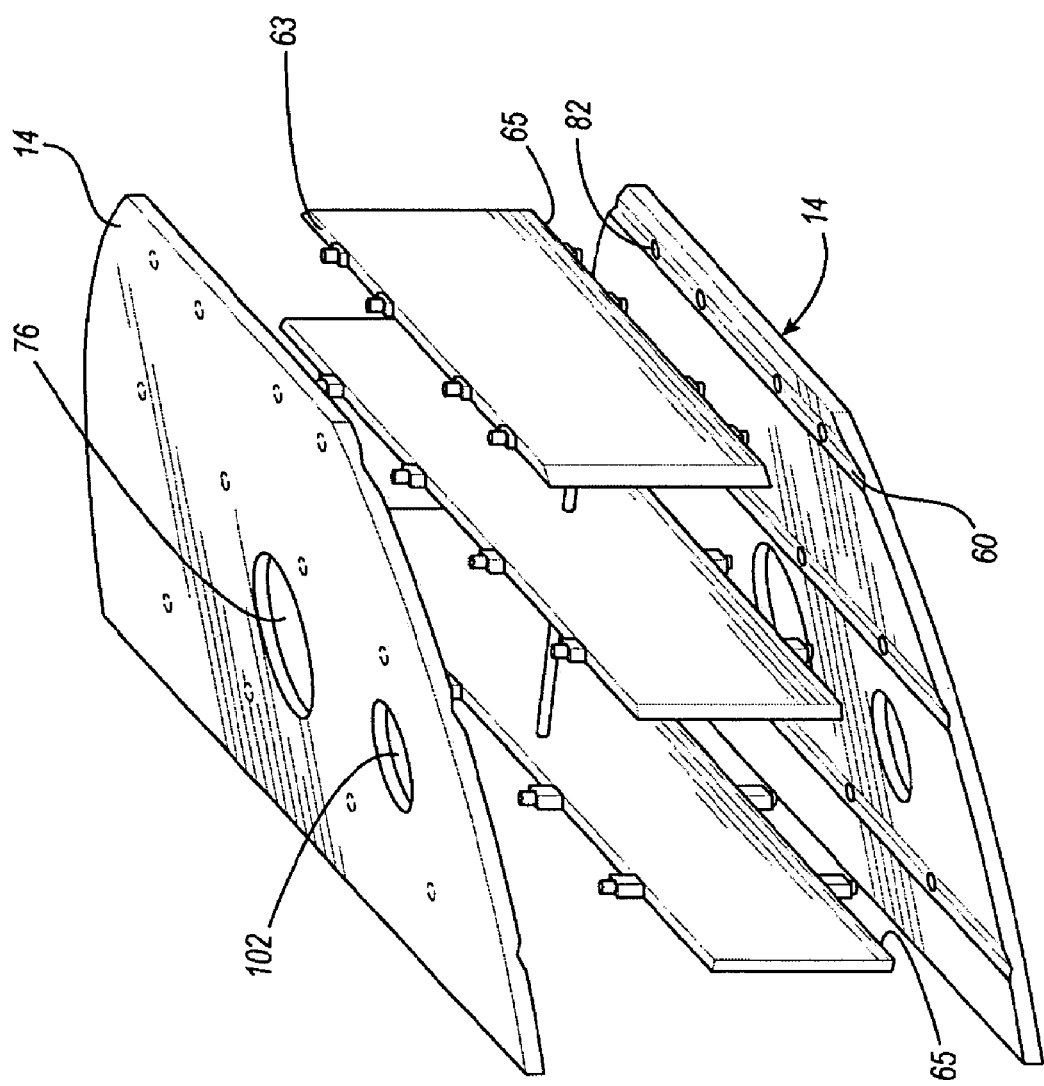
FIG. 2 shows an exploded view of one embodiment of the present invention with two inclined plates with the multi-partition wall filter to be engaged therebetween.

Referring now specifically to FIGS. 1 and 2, according to one embodiment of the invention, the multi-partition wall assembly 16 of one embodiment of the present invention is shown. The assembly consists of at least one filtering wall(s) or dams 66 connected by at least one spacing support 64. The top 63 and bottom 65 edges of the multi-partition wall 66 comprises a plurality of connecting pins 78 with male end 80.

As shown in FIG. 2, according to one embodiment of the present invention, the inclined settling plates 14 comprise a plurality of female receiving locations 82 designed and dimensioned to receive the male ends 80 of the multi-partition wall assembly 16 (See FIG. 1), thus forming one assembled portion 18 (See FIG. 3) of an embodiment of the present invention. The present invention further contemplates having fastening and spacing elements such, as, for example, the connecting pins 78 with the male end 80 as an integral part of the settling plate with the female receiving location being oriented as an integral part of the partition wall, or any combination thereof, as desired.

Figure 3:
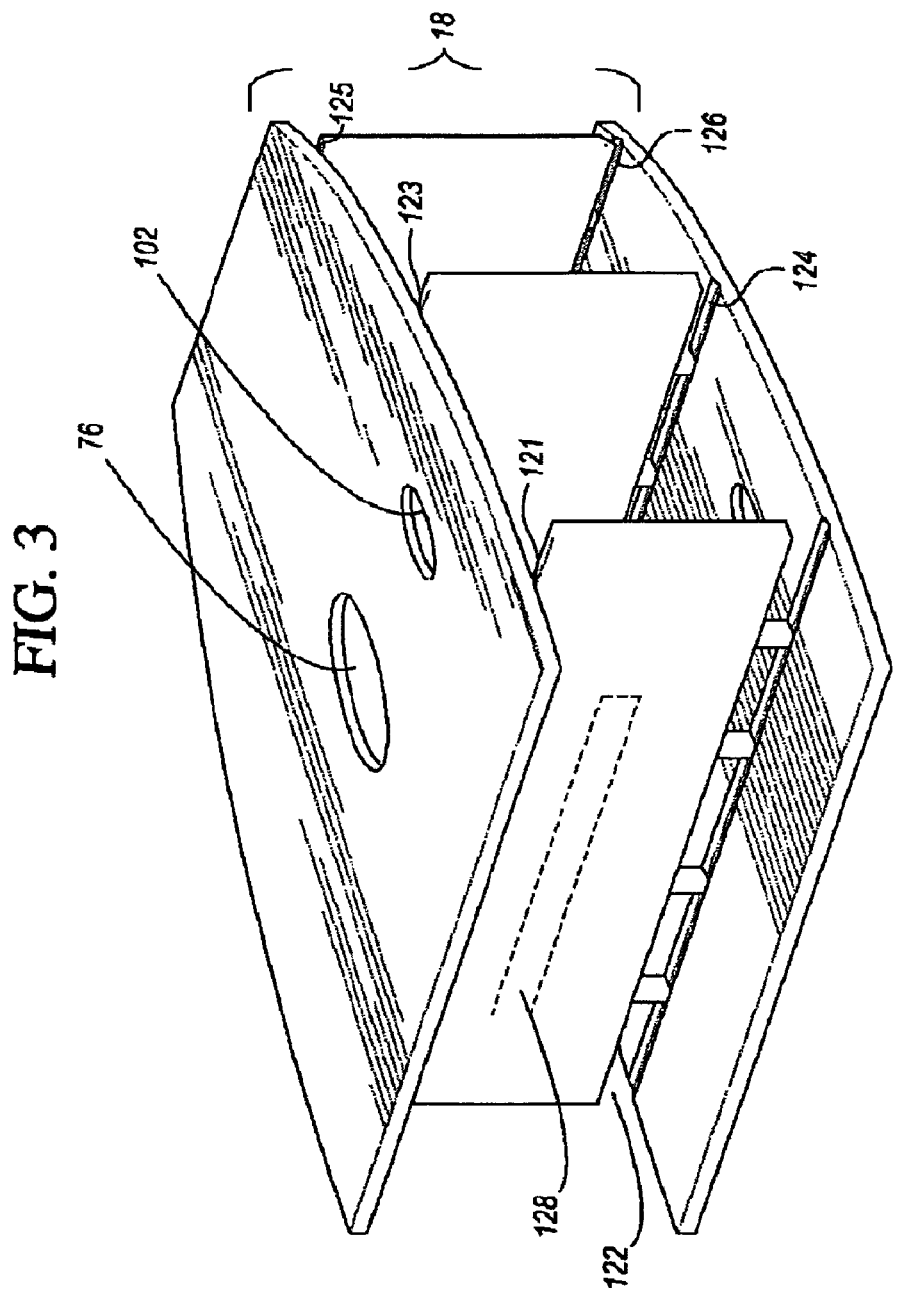
FIG. 3 shows a perspective view of an assembled portion of the embodiment shown in FIG. 2.

In one embodiment of the present invention, as shown in FIGS. 2 and 3, the connecting pins 78 also play an important structural role in the filtering action of the filter unit 10. The dimension (e.g. height) of each connecting pin 78 assists in determining the distance between each multi-partition wall 66 and the adjacent inclined settling plate 14, thus creating apertures. The connecting pins 78 must provide a sufficient distance between each multi-partition wall 66 and the adjacent inclined settling plate 14, such that a series of gaps, or apertures 122, 124 and 126 are formed between at least the edge 65 of the filtering walls or dams 66 and the first or second surfaces 60 of an adjacent inclined settling plate 14. Similarly, apertures 121, 123 and 125 are formed between at least the edge 65 of the filtering walls or dams 66 and the underside of an adjacent inclined settling plate 14

As shown in FIG. 3, the dimension of each gap, or apertures 122, 124 and 126 in the series of apertures changes, and preferably becomes progressively smaller, such that the level of filtration becomes greater as liquid passes through. The dimensions of each connecting pin 78, therefore, also become smaller as liquid moves through each subsequent gap created above or below each partition wall. This produces a progressively smaller or "thinning" aperture dimension, such that wide substances such as, for example, toilet paper, etc. become trapped within the filter, while liquid is allowed to pass through. Additional apertures, or filter slots 128 may be added as desired into the partition wall 66 on the inlet side, as well as the outlet wall. These slots 128 would be substantially the same size (opening) as apertures 122 and 126 respectively, or could be differently sized. Preferably, at least one, substantially circular rod channel 76 is positioned on diametrically opposing sides of each inclined settling plate 14 for receiving rods of a positioning unit, such as, for example, a handle. An additional opening 102 is provided in each settling plate. The openings 102 in each settling plate are aligned. One purpose for such an opening 102 is to receive an optional alarm system (not shown, but known in the field), within the filter unit 18. One such alarm system that can be incorporated into embodiments of the present invention is provided in U.S. Pat. No. 6,841,066, which is incorporated by reference as if made a part of the present specification.

Figure 4:
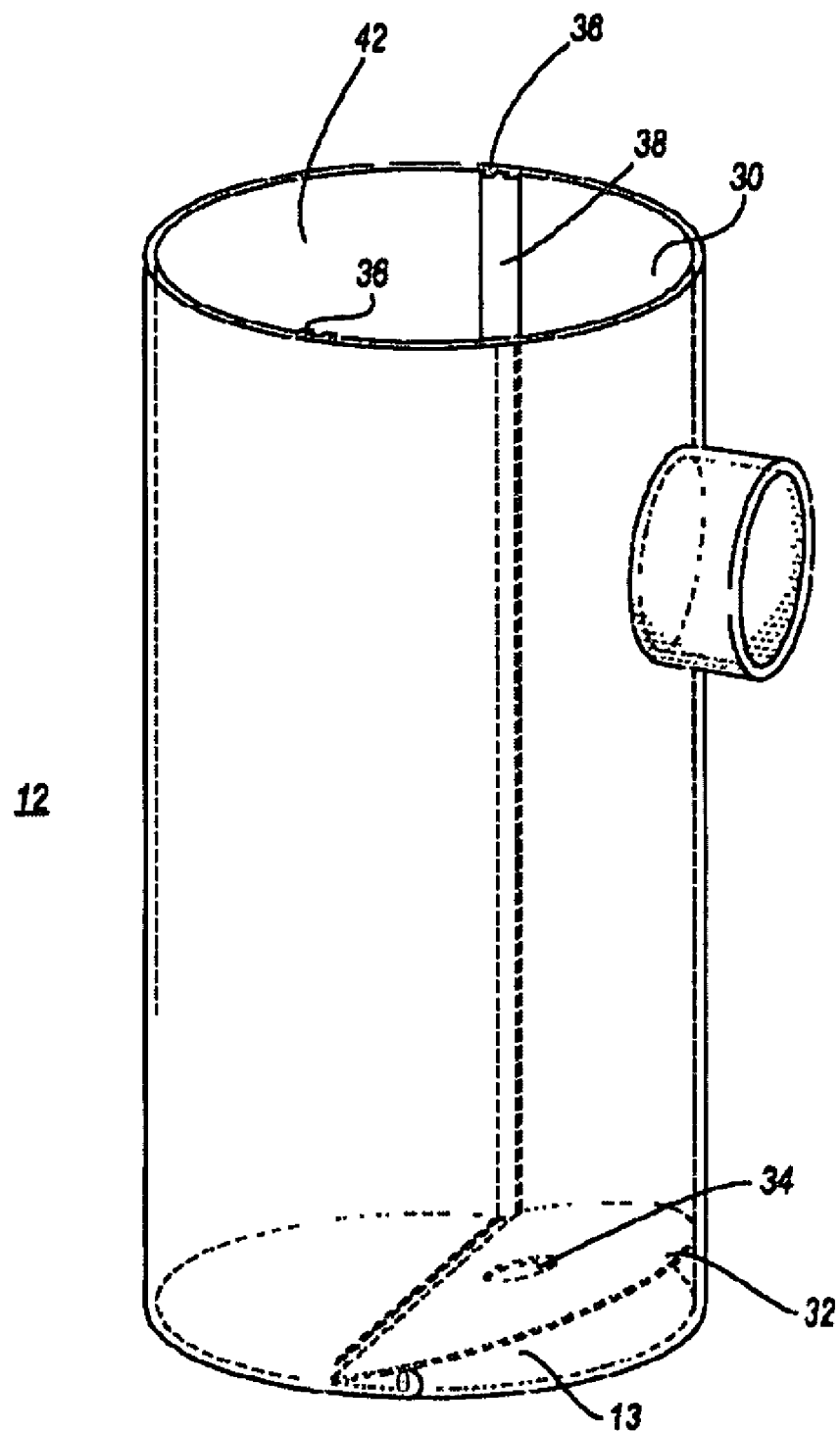
FIG. 4 shows a perspective, partially exposed view of one embodiment of the present invention comprising a filter housing, or case.

FIG. 4 shows an embodiment of the present invention, where the filter housing, or case 12 comprises a first section 30 that holds the filter assembly 18. The base of the case 12 shows that the first section 30 comprises an inclined lower shelf 32 upon which rests the filter cartridges 18, along with a receptacle 34 into which the assembly rod seats, to assist in retaining the cartridges in place, as desired. The interior walls of the case 12 have a series of receiving members, or tracks 36 forming a channel 38 into which a maintenance plate 40 (See FIG. 5) is inserted and "slid" into place, in order to block the flow of liquid from the second (unfiltered) section 42 of the case 12 to the section 30. This allows the filter cartridge 18 to be removed and cleaned, serviced or replaced without allowing unfiltered liquids to exit the septic tank. FIGS. 5 and 9 show alternate embodiments of the filter cartridges 18 and 118 in place in their respective cases 12 and 112, respectively, with the maintenance plate 40 also in place. Not shown is a rod, upon which the sections of settling plates stack. The rod is then preferably capped at both ends, securing the plates tightly together.

Figure 6:
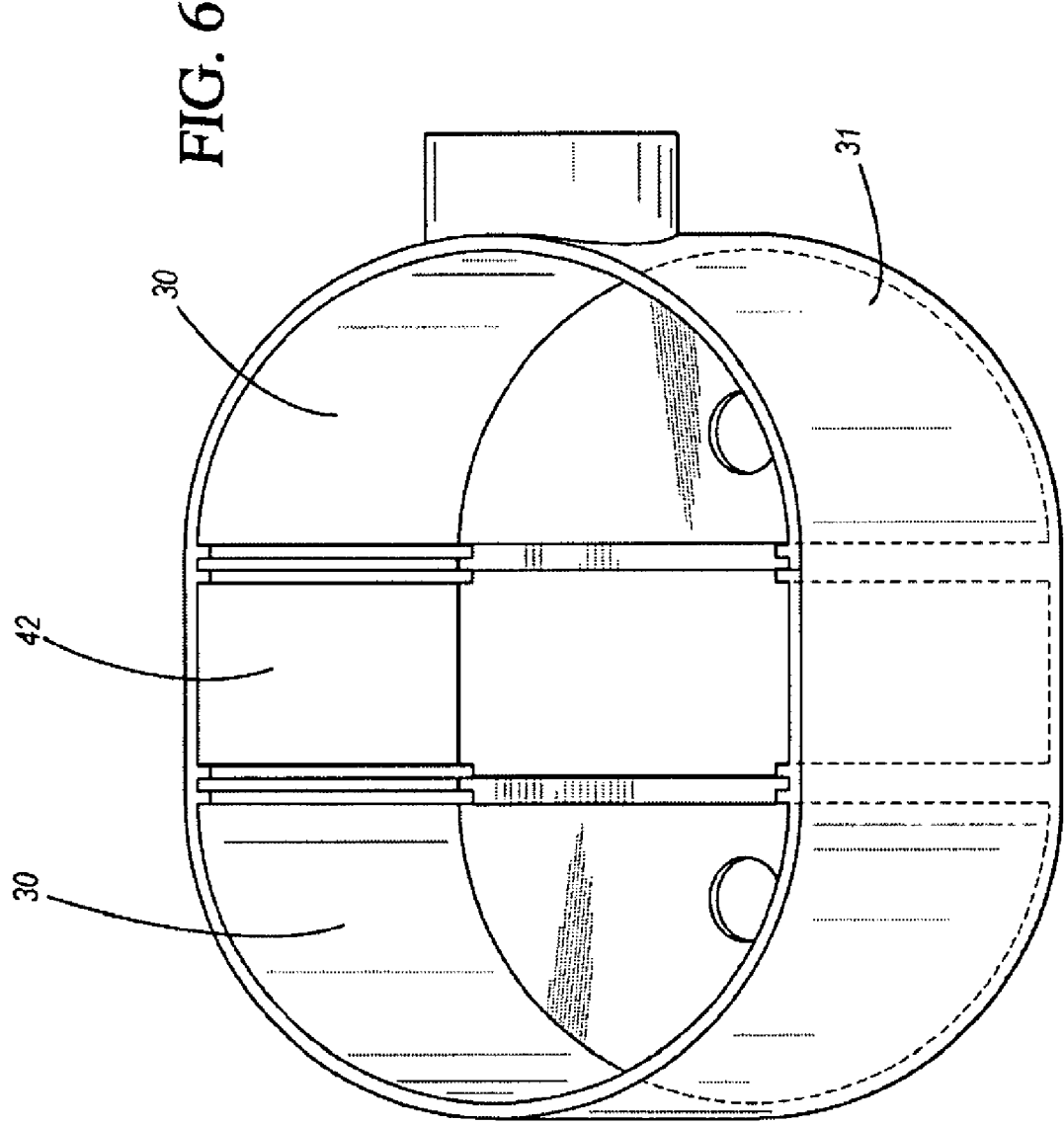
FIG. 6 shows a perspective view of one embodiment of the present invention showing a dual filter housing with a plurality of receiving zones.
Figure 7:
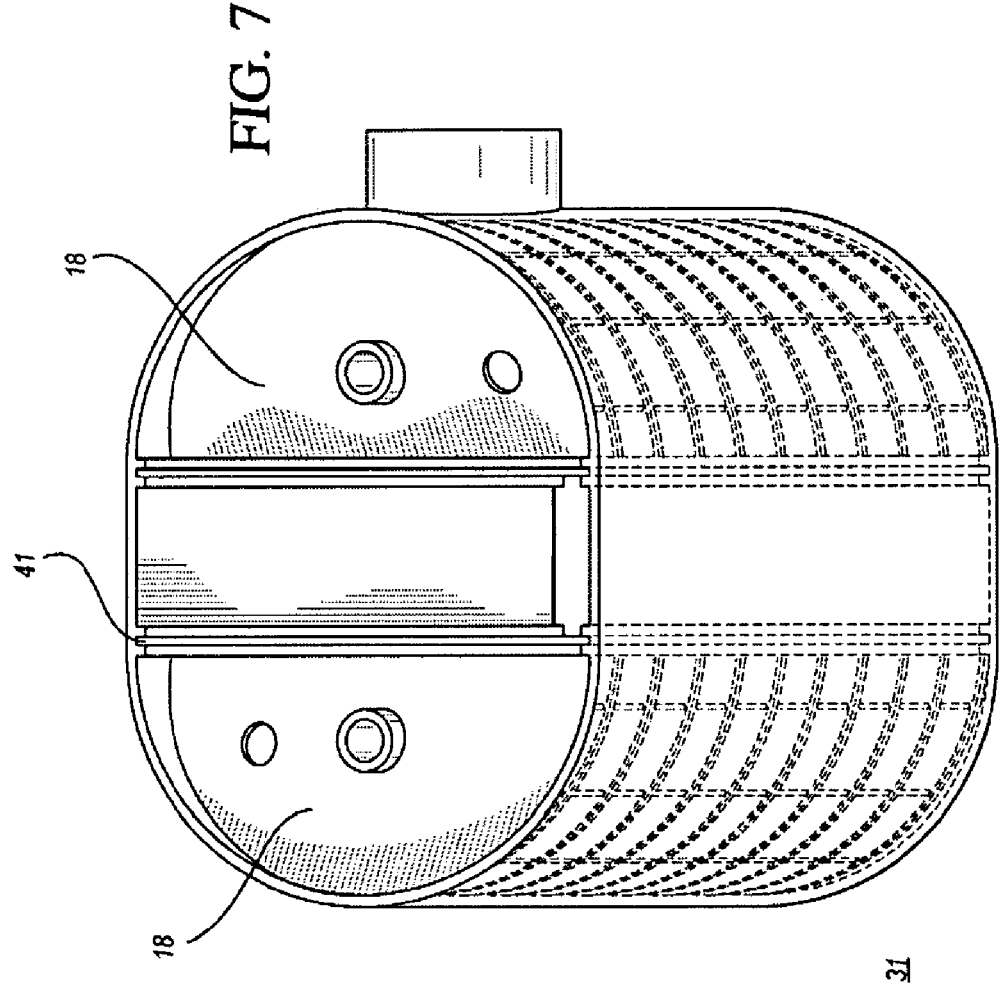
FIG. 7 shows a perspective view of an embodiment of the present invention showing a dual housing with two filter cartridges in place.

FIG. 6 shows another embodiment of the present invention, where the filter case 12 comprises dual filter receiving zones 30 and an unfiltered flow channel 42 near the center of the case 12. FIG. 7 shows this case with two filter cartridges in place.

Figure 8:
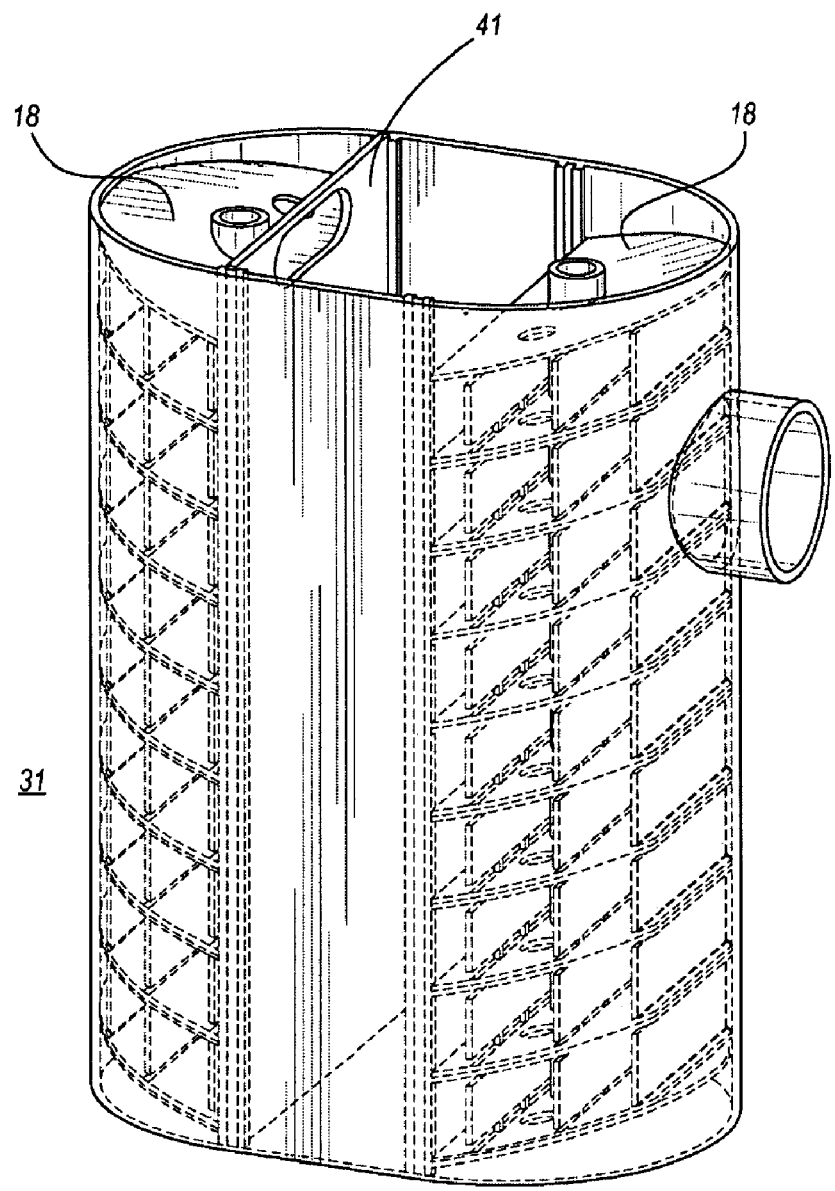
FIG. 8 shows a side perspective view of the dual housing embodiment of FIG. 7, showing the maintenance plate impeding flow to the reserve filter cartridge.

FIGS. 7 and 8 further show the dual filter case 31, having two filter cartridges 18 in place. The maintenance plate 41 is in place, keeping a reserve cartridge from becoming soiled until needed to replace the cartridge 18 in the first filter zone.

The present invention, therefore, contemplates an improved filtration system having at least one partial partition wall placed substantially perpendicular to, and between, adjacent planar walls to form at least two filter apertures. Filter apertures are created between an area at the top edge of the weir wall and the bottom planar surface of one inclined plate. The second aperture is preferably created at an area between the bottom edge of the weir wall and the top planar surface of the adjoining inclined settling plate. The system preferably comprises substantially smooth surfaces that are preferably inclined at an angle of less than 90° relative to the planar floor 13 of the housing 12, as shown by angle Ø in FIG. 4. However, the surfaces may be textured, or they may be at an angle of 0° (FIG. 9), if desired. As stated above, two or more partition walls may be present. In one embodiment, the aperture area of each progressive wall changes or remains constant, but preferably becomes smaller in size.

Embodiments of the present invention further comprise a mounting means for mounting a high level alert device, or alarm system, preferably located in a filtered waste water side of the filter device. The mounting means may be integral with the filter device. Further, filter elements preferably have a closed bottom mounted in the filter housing and comprise a means for installing a maintenance plate to block the flow out of the tank during filter cleaning, maintenance or replacement. The inclined shelf or shelving on the bottom of the filter housing preferably has a receptacle to allow a handle, such as, for example, a rod to engage the unit and preferably lock into place. In addition, a receptacle is preferably located in the back of the filter housing for storing at least one maintenance plate and optionally a spare filter cartridge.

A central flow channel in the system is designed to encourage a well-developed laminar flow regime to optimize separation of solids and to maximize retention time within the filter system. By facilitating and/or creating a large flow area within the case itself prior to liquid entering the filter, the velocity of the flow is reduced thus allowing the opportunity for solids to settle back into the septic tank for further treatment. This too increases the service life of the filter.

While the apertures of varying dimension are shown in the figures as occurring at the "top" and "bottom" of the partitions, it is contemplated herein that the apertures may occur on the sides of the partition also, to enhance filtering performance as desired, with or without the presence of connecting pins.

Figure 10:
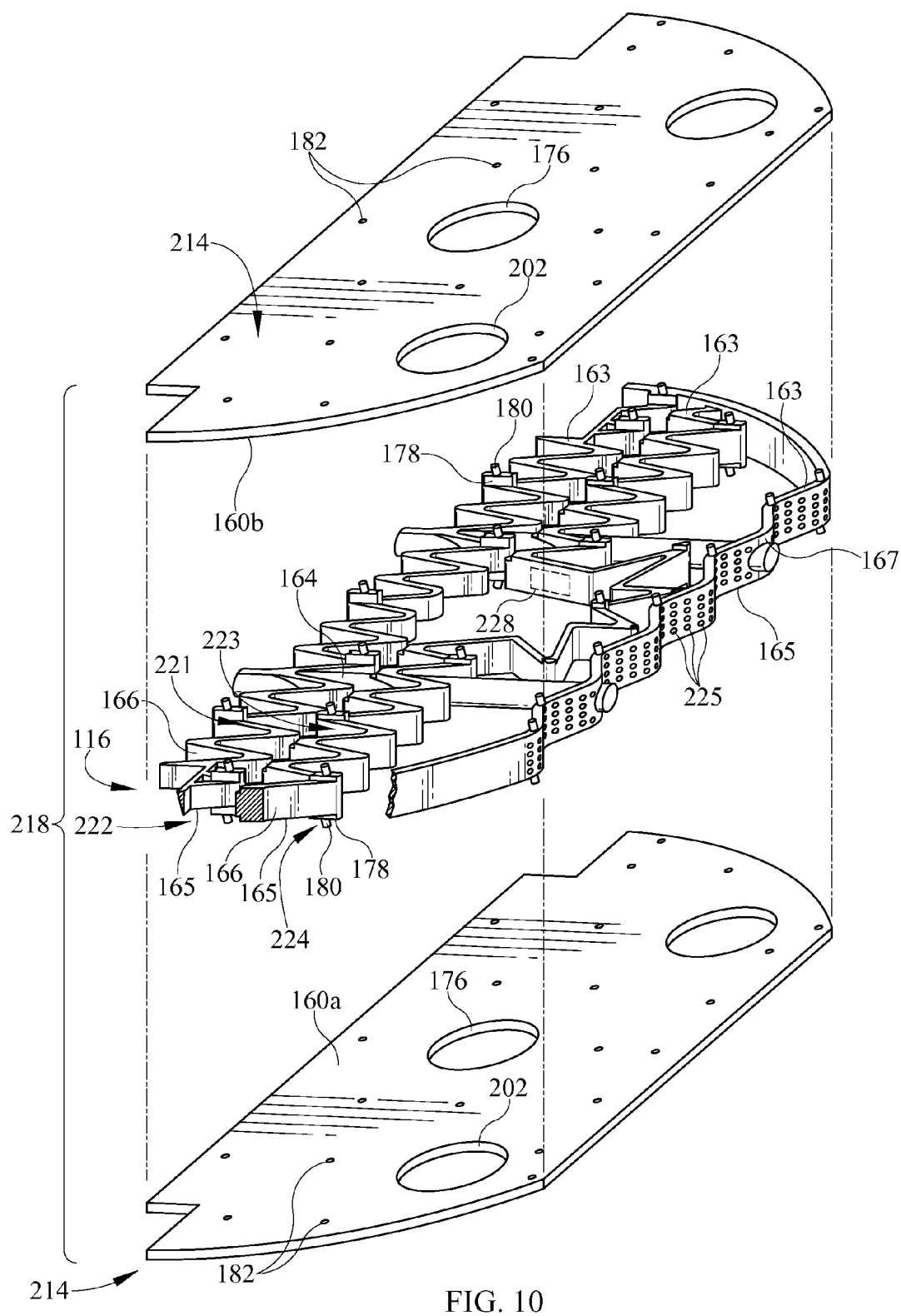
FIG. 10 shows a perspective view of another embodiment of a multi-partition wall filter component with the settling plates exploded away from the partition walls and portions of the multi-partition wall broken away.
Figure 11:
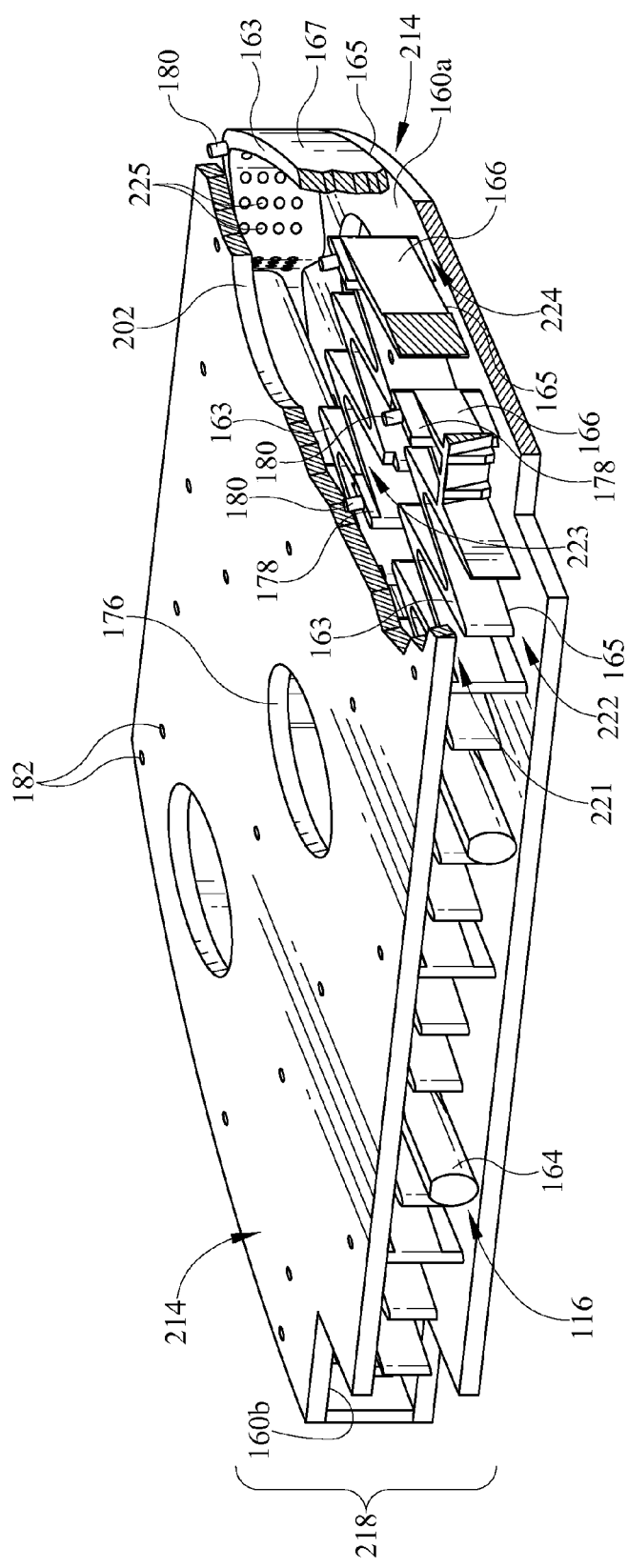
FIG. 11 shows a perspective view of an assembled portion of the embodiment shown in FIG. 10 with portions broken away to illustrate the multi-partition wall.
Figure 12:
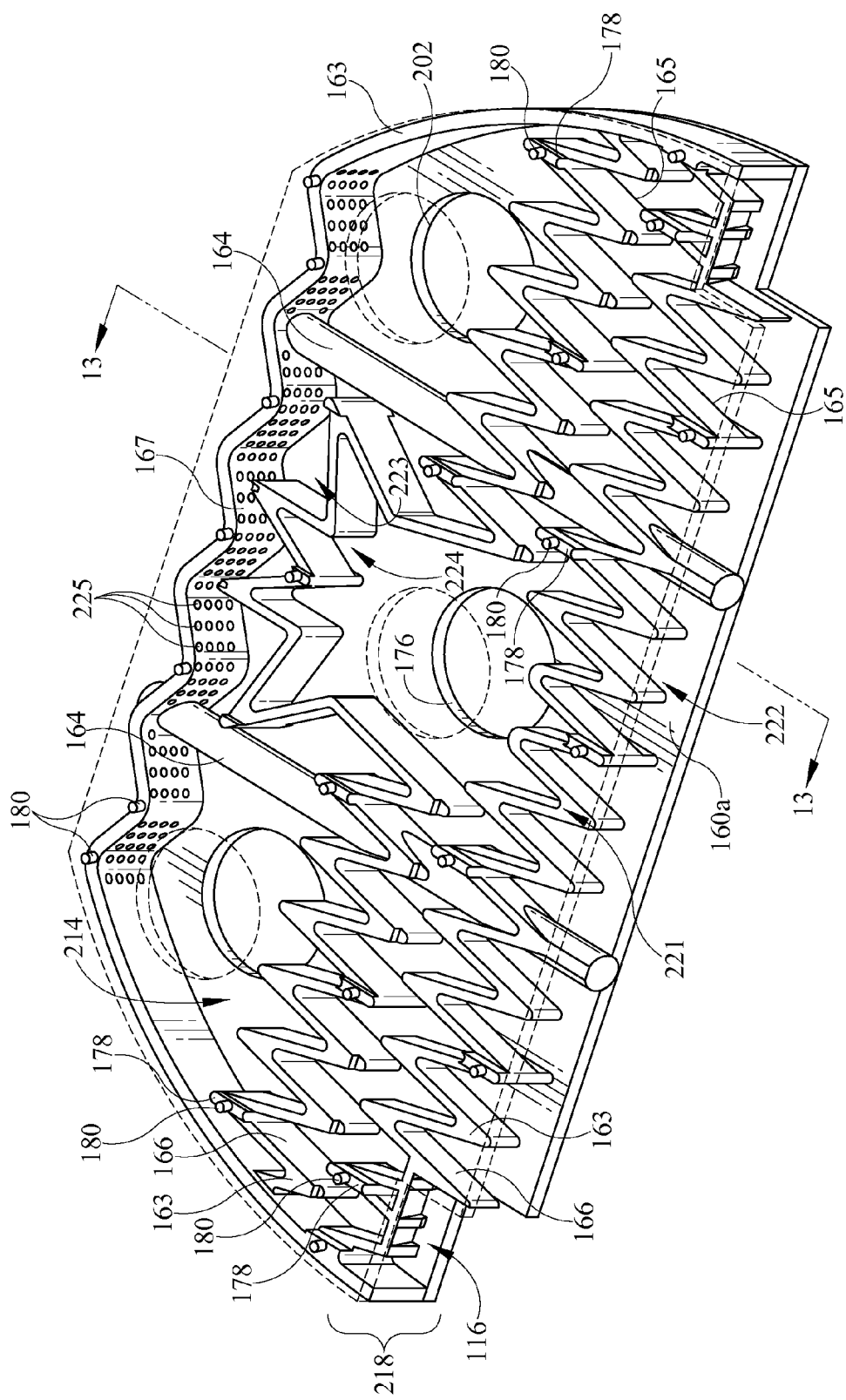
FIG. 12 shows a perspective view of an assembled portion of the embodiment shown in FIG. 10 with the top settling plate removed to illustrate the multi-partition wall.
Figure 13:
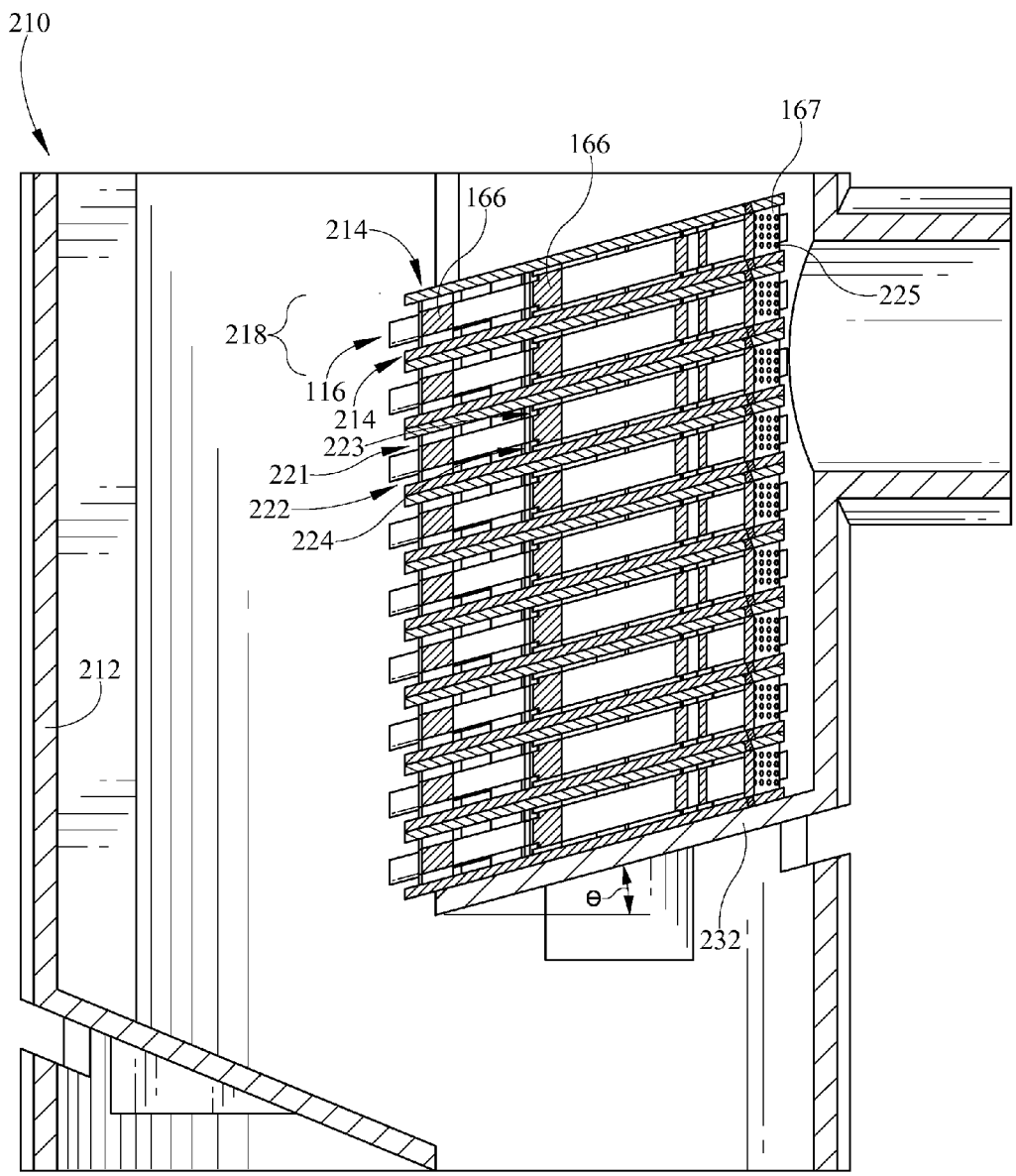
FIG. 13 shows a side, sectional view of an assembled portion of the embodiment shown in FIG. 12 taken along line 13-13 positioned within a filter housing.

As shown in FIGS. 10-13, another embodiment of the filter assembly 218 may include a multi-partition wall assembly 116 positioned within a filter unit 210 (FIG. 13). The assembly 116 consists of one or more filtering wall(s) or dams 166 that may be connected by at least one spacing support 164. The top 163 and bottom 165 edges of the multi-partition wall 166 contains a plurality of connecting pins 178 with a male end 180. The inclined settling plates 214 may be positioned at a variety of angles Ø as described above and comprise a plurality of female receiving locations 182 designed and dimensioned to receive the male ends 180 of the multi-partition wall assembly 116 (FIG. 13), thus forming one assembled portion 218 (FIG. 11) of an embodiment of the present invention. Assembly 116 includes at least one wall or dam 167 with top 163 and bottom 165 edges. Each top 163 and bottom 165 edges of filtering wall 167 have male ends 180 received within female receiving locations 182 (FIG. 11). It is further contemplated having fastening and spacing elements such, as, for example, the male ends 180 with or without the connecting pins 178 as an integral part of the settling plate with the female receiving location being oriented as an integral part of the partition wall, or any combination thereof, as desired. Although the walls 166 and 167 are shown as serpentine in shape, it is understood that the walls may be a variety of shapes, including substantially planar as shown in FIG. 1, quantities, sizes, different positions with the filter assembly, and construction.

As shown in FIGS. 10-13, the connecting pins 178 play an important structural role in the filtering action of the filter unit 210. The dimension (e.g. height) of each connecting pin 178 assists in determining the distance between each multi-partition wall 166 and the adjacent inclined settling plate 214, thus creating apertures. The connecting pins 178 must provide a sufficient distance between each multi-partition wall 166 and the adjacent inclined settling plate 214, such that a series of gaps, or apertures 222 and 224 are formed between at least the edge 165 of the filtering walls or dams 166 and the first or second surfaces 160a of an adjacent inclined settling plate 214. Similarly, apertures 221 and 223 are formed between at least the edge 163 of the filtering walls or dams 166 and the underside surface 160b of an adjacent inclined settling plate 214. Unlike walls 166, partition wall 167 may not include pins 178 creating apertures between edge 165 and 163 and an adjacent inclined settling plate 214 (FIG. 12). The top and bottom edges 163 and 165 of wall 167 directly engage or seal the surfaces 160b and 160a, respectively, with apertures 225 extending through wall 167. Apertures 225 of wall 167 may extend for only a portion of the length or width of the wall as shown or may be positioned with a variety of different lengths, widths, or patterns, such as the entire length or width of the wall.

As shown in the figures, the dimensions of each gap, or apertures 222, 224, 225 in the series of apertures, changes in at least two filtering walls, either in two walls adjacent to each other or as a result of skipping one or more walls, and preferably becomes progressively smaller, such that the level of filtration becomes greater as liquid passes through. For example, the dimensions of each connecting pin 178, therefore, may also become smaller as liquid moves through each subsequent gap created above or below each partition wall 166. This produces a progressively smaller or "thinning" aperture dimension, such that wide substances such as, for example, toilet paper, etc. become trapped within the filter, while liquid is allowed to pass through. However, apertures of a subsequent or adjacent plate may be equal in dimensions or larger than the preceding plate in the direction of effluent flow. For example, apertures 225 may be a larger opening than the 222 and 224 apertures. Apertures 225 of wall 167 may be a different through shape than the slot shaped apertures 222 and 224 of walls 166 to prevent a thin sheet of a non-biodegradable solid, like the backing of a band-aid, sanitary napkin, etc. from passing out of the filter assembly as could occur with a similar slot shaped aperture of wall 167. The apertures 225 of wall 167 may be a variety of different shapes and still be different from an aperture of a preceding wall. For example, an aperture 225 may be, but is not limited to, substantially circular, about 0.25 inches in diameter, as compared to one of the apertures 222 and 224 having a different shape such as slotted (as shown), rectangular, square, etc. Thus, the different shaped apertures between walls may prevent objects with different shaped cross sections from passing through predetermined apertures of the walls of the filter assembly. Therefore although apertures 225 are shown as integral within wall 167, apertures 225 of wall 167 may be created partially by a portion of inclined settling plates 214. Further, although wall 167 is shown as the last through wall in the direction of effluent flow, it is understood that one or more walls 167 may be positioned at various positions within the effluent flow or filter assembly. For example, wall 167 may be positioned before one or more walls 166 or between two adjacent walls 166 in the direction of effluent flow. Additional apertures or filter slots 228 may be added as desired into the partition walls 166 (FIG. 10). These slots 228 could be substantially the same size (opening) or shape as apertures 222 and 224 respectively, or could be differently sized or shaped.

Preferably, at least one, substantially circular rod channel 176 is positioned in each inclined settling plate 214 in alignment with the corresponding channel 176 in each other plate 214 for receiving rods of a positioning unit, such as, for example, a handle. An additional opening 202 is provided in each settling plate. The openings 202 in each settling plate are aligned. One purpose for such an opening 202 is to receive an optional alarm system (not shown, but known in the field), within the filter unit 218. One such alarm system that can be incorporated into embodiments of the present invention is disclosed in U.S. Pat. No. 6,841,066, which is incorporated by reference as if made a part of the present specification.

FIG. 13 shows an embodiment of the present invention, where the filter housing or case 212 holds one or more of the filter assemblies 218. The lower portion of the case 212 includes an inclined lower shelf 232 at angle Ø upon which rests one or more of the filter assemblies 218, along with a receptacle 34 (as shown in FIG. 4) into which the assembly rod (not shown) seats, to assist in retaining the cartridges in place, as desired. The rod is preferably capped at both ends, securing the plates tightly together. Although the settling plates 214 of filter assembly 218 are shown inclined in the embodiments of FIGS. 9-13, it should be understood that the settling plates are not limited to a variety of angled positions but may be horizontal within the filter case as shown in FIG. 9.

The invention may be embodied in other specific forms without departing from the spirit or essential characteristics thereof. The present embodiments are therefore to be construed in all respects as illustrative and not restrictive, the scope of the invention being indicated by the claims set forth below rather than by the foregoing description. All changes which come within the meaning and range of equivalency of the claims are therefore intended to be embraced therein.

I claim:

1. An apparatus for filtering effluent comprising:
a filtering assembly including a plurality of substantially planar components spaced apart by two or more partitions;
said two or more partitions spaced apart from each other along the direction of effluent flow;
said two or more partitions oriented to create a series of apertures of varying dimension such that said aperture dimensions progressively decrease in the direction of the effluent flow; and
at least one of said two or more partitions having one or more apertures with a different shape than said apertures of at least one of said two or more partitions.

2. The apparatus of claim 1 wherein said series of apertures are slotted and said one or more apertures of said at least one partition are substantially circular.

3. The apparatus of claim 1 wherein said at least one partition having one or more apertures with said different shape being sealed across a top and bottom edge with adjacent said planar components.

4. The apparatus of claim 1 wherein said at least one partition having one or more apertures with said different shape is spaced last in the direction of the effluent flow.

5. The apparatus of claim 1 wherein said plurality of substantially planar components are positioned at an incline.

6. The apparatus of claim 5 wherein said planar components are positioned at a predetermined incline less than 90 degrees.

7. The apparatus of claim 1 wherein said plurality of substantially planar components are positioned substantially horizontally.

8. An apparatus for filtering effluent comprising:
a housing including an inlet and an outlet, said housing dimensioned to receive a filtering assembly;
said filtering assembly including a first and second substantially planar component, said first and second planar components spaced apart by at least a first, second, and third partition, said first, second, and third partition are spaced apart along the direction of an effluent flow, said third partition is positioned after said first and second partitions along the direction of the effluent flow, said first and second partitions each including at least one aperture, said aperture bounded partially by a surface of said first or second planar components;
said first partition, when in position with said first or second planar component provides said aperture having a first dimension, and said second partition when in the first or second position with said planar component provides said aperture having a second dimension, such that said first and second aperture dimensions are not equal; and
said third partition provides apertures having a shape that is different than at least one of said first or said second partition apertures.

9. The apparatus of claim 8 wherein said apertures of said third partition are integral within said third partition.

10. The apparatus of claim 8 wherein at least one of said first or second planar components is positioned at a predetermined incline.

11. The apparatus of claim 10 wherein said predetermined incline is less than 90 degrees.

12. The apparatus of claim 8 wherein said first and second planar components is positioned substantially horizontal.

13. The apparatus of claim 8 wherein said first and second partition apertures are slotted and said third partition apertures are substantially circular in shape.

14. The apparatus of claim 8 wherein said third partition aperture has a third dimension, and said first, second, and third aperture dimensions are unequal.

15. An apparatus for filtering effluent comprising:
a filter housing receiving a filtering assembly;
said filtering assembly including a plurality of substantially inclined planar components spaced apart by two or more partitions;
said two or more partitions spaced apart from each other along the direction of effluent flow;
said two or more partitions having one or more apertures of varying dimension such that said aperture dimensions progressively decrease in the direction of the effluent flow; and
at least one of said two or more partitions having one or more apertures with a different shape than said one or more apertures of at least one of said two or more partitions.

16. The apparatus of claim 15 wherein said at least one partition having said one or more apertures with said different shape being the last partition of said two or more partitions in the direction of effluent flow.

17. The apparatus of claim 15 wherein said incline is less than 90 degrees.

18. The apparatus of claim 15 wherein at least one of said apertures of said at least one partition having said one or more apertures with said different shape is circular in shape.

19. The apparatus of claim 18 wherein said apertures of said two or more partitions are substantially horizontal slots.

20. The apparatus of claim 18 wherein said one or more apertures of said two or more partitions are bounded partially by a surface of said first or second planar components.

21. A method for filtering effluent comprising:
providing a housing dimensioned to receive a filtering assembly, said housing including an inlet and an outlet;
said assembly including a plurality of inclined substantially planar components spaced apart by two or more partitions, said two or more partitions creating a series of apertures of varying dimension which progressively decrease in the direction of the effluent flow;
said two or more partitions spaced apart from each other along the direction of effluent flow;
providing a last partition in the direction of effluent flow of said two or more partitions having one or more apertures with a different shape than said aperture of a preceding partition of said two or more partitions;
providing the effluent flow to said assembly in said housing;
directing effluent flow through said assembly such that only the effluent having predetermined characteristics moves past said two or more partitions and adjacent said inclined planar components; and
blocking effluent having predetermined shapes from passing through said last partition with said one or more apertures.

22. The method of claim 21 wherein said last partition seals against said adjacent inclined substantially planar components.

23. The method of claim 21 wherein said one or more apertures of said last partition is substantially circular in shape.

* * * * *